United States Patent
Wu et al.

(10) Patent No.: US 7,330,984 B2
(45) Date of Patent: Feb. 12, 2008

(54) POWER MONITORING CIRCUIT HAVING AUTOMATIC FEEDBACK AND OVERLOAD PROTECTION

(75) Inventors: Yung-Lu Wu, Taipei (TW); Wen-Chun Shen, Taipei (TW); Jung-Hua Chung, Tao Yuan Shien (TW)

(73) Assignee: Quanta Computer Inc., Tao Yuan Shien (TW)

( * ) Notice: Subject to any disclaimer, the term of this patent is extended or adjusted under 35 U.S.C. 154(b) by 384 days.

(21) Appl. No.: 11/092,691

(22) Filed: Mar. 30, 2005

(65) Prior Publication Data

US 2006/0010330 A1      Jan. 12, 2006

(30) Foreign Application Priority Data

Jul. 6, 2004      (TW)      ............................... 93120265 A

(51) Int. Cl.
G06F 1/00      (2006.01)
G06F 1/32      (2006.01)

(52) U.S. Cl. ...................... 713/300; 713/320; 713/340

(58) Field of Classification Search ................. 713/300
See application file for complete search history.

(56) References Cited

U.S. PATENT DOCUMENTS 7,017,058 B2 *   3/2006   Chen ........................... 713/322
2003/0221133 A1 * 11/2003   Nguyen et al. ............. 713/300
2004/0003301 A1 *  1/2004   Nguyen ....................... 713/300

FOREIGN PATENT DOCUMENTS

TW      525862      3/2003
TW      553551      9/2003

* cited by examiner

*Primary Examiner*—James K. Trusillo
*Assistant Examiner*—Stefan Stoynov
(74) *Attorney, Agent, or Firm*—Rabin & Berdo, PC

(57)      ABSTRACT

A power monitoring circuit having an automatic feedback function and an overload protection function is described. The power monitoring circuit has a current detection module, a voltage detection module, a multiplication module, and an overload protection module. The current detection module is used to obtain the current value of a power supply path. The voltage detection module is used to obtain the voltage value of the power supply path. The multiplication module generates the power value of the power supply path with reference to the current value and the voltage value. The overload protection module determines, with reference to the power value, whether to switch off the input of the power supply path, so that the overload protection module protects the system load connected to the power supply path. The current detection module, the voltage detection module, and the multiplication module are integrated into a chip.

20 Claims, 1 Drawing Sheet

POWER MONITORING CIRCUIT HAVING AUTOMATIC FEEDBACK AND OVERLOAD PROTECTION

RELATED APPLICATIONS

The present application is based on, and claims priority from, Taiwan Application Serial Number 93120265, filed Jul. 6, 2004, the disclosure of which is hereby incorporated by reference herein in its entirety.

BACKGROUND

1. Field of Invention

The present invention relates to a power monitoring circuit. More particularly, the present invention relates to a power monitoring circuit having an automatic feedback and overload protection function.

2. Description of Related Art

With the development of electronic technology, the volume of electronic systems is getting smaller, but the amount of information to be processed is becoming larger day by day. A great amount of calculation results in overly large power consumption. Thus, heat generated by an electronic system becomes a serious problem. The life span of the electronic system may be reduced if it works at an overly high temperature. The heat may even damage the electronic system.

Therefore, an electronic system needs a power management device for effective power management. Conventionally, a laptop computer only measures the current and the voltage value of its power source and monitors the power source according to a safe range of the current value.

However, a laptop computer usually has two power supply systems: a battery and an AC power source. When the same power is consumed by the laptop computer, currents provided by the battery and the AC power source are different. Traditionally, monitoring the current value from the power source cannot satisfy both power supply systems. The conventional evaluation of power consumption calculated by the current value is overly high or overly low. In addition, conventional power systems cannot provide real time feedback. Some systems rely only on fuses to protect them from overload.

SUMMARY

It is therefore an objective of the present invention to provide a power monitoring circuit that can detect power and automatically feed back to an input of a power supply path to protect a system load connected to the power supply path.

It is another objective of the present invention to provide a power monitoring circuit that can generate a heat control signal to the system load to reduce the temperature or the power.

It is still another objective of the present invention to provide a power monitoring circuit that can set safe ranges for voltage value, current value, power value, and temperature value.

It is still another objective of the present invention to provide a power monitoring circuit, where a single chip is used to detect automatically the power and feed back to the power supply path.

In accordance with the foregoing and other objectives of the present invention, a power monitoring circuit having an automatic feedback function and an overload protection function is described. The power monitoring circuit includes a current detection module, a voltage detection module, a multiplication module, and a power overload protection module. The current detection module is used to obtain a current value of a power supply path. The voltage detection module is used to obtain a voltage value of the power supply path. The multiplication module is used to generate a power value using the current value and the voltage value. The power overload protection module is used to determine whether the power supply path should be switched off according to the power value, so that the power overload protection module protects a system load connected to the power supply path. The current detection module, the voltage detection module, and the multiplication module are integrated within a chip.

The power monitoring circuit can further include a power unit controller. The power unit controller generates a heat control signal according to the current value, the voltage value, and the power value. The power unit controller sends the heat control signal to the system load to provide the system load with power information. The system load determines a working frequency of a central processing unit of the system load according to the heat control signal. The system load can also determine a rotary speed of a fan according to the heat control signal.

The power overload protection module can set safe ranges for the voltage value, the current value, the power value, or the temperature value to determine whether to switch off the input of the power supply path to protect the system load connected to the power supply path.

The invention has at least the following advantages. Each embodiment can present one or more of the advantages. The power monitoring circuit can detect power and automatically feed back to an input of a power supply path to protect a system load connected to the power supply path. The power monitoring circuit can generate a heat control signal to the system load to reduce the temperature or the power. The system load can determine a working frequency of a central processing unit of the system load according to the heat control signal. The system load can also determine a rotary speed of a fan to dissipate the heat generated by the system load according to the heat control signal. The power monitoring circuit can set safe ranges for voltage value, current value, temperature value, and power value. A single chip is used to detect automatically the power and feed back to the power supply path.

It is to be understood that both the foregoing general description and the following detailed description are examples, and are intended to provide further explanation of the invention as claimed.

BRIEF DESCRIPTION OF THE DRAWINGS

The accompanying drawing is included to provide further understanding of the invention, and is incorporated in and constitutes a part of this specification. The drawing illustrates embodiments of the invention and, together with the description, serves to explain the principles of the invention. In the drawing.

DESCRIPTION OF THE PREFERRED EMBODIMENTS

Figure 1:
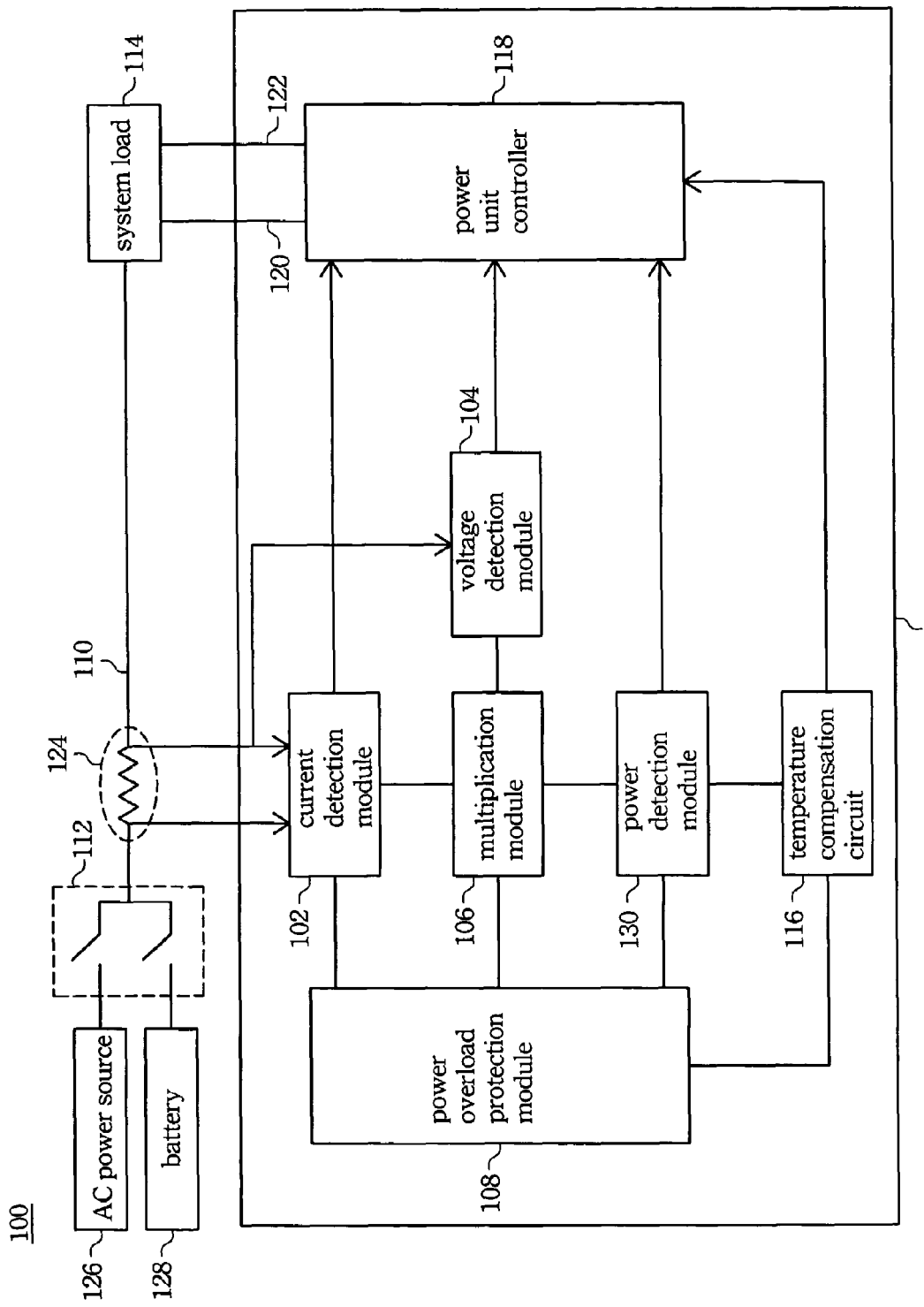
FIG. 1 is a block diagram illustrating an embodiment according to the invention.

Reference will now be made in detail to the present preferred embodiments of the invention, examples of which are illustrated in the accompanying drawing. Wherever possible, the same reference numbers are used in the drawing and the description to refer to the same or like parts.

FIG. 1 is a block diagram illustrating an embodiment according to the invention. With reference to FIG. 1, a power monitoring circuit 100 provides an automatic feedback function and an overload protection function. The power monitoring circuit 100 includes a current detection module 102, a voltage detection module 104, a multiplication module 106, and a power overload protection module 108. The current detection module 102 is used to obtain a current value of a power supply path 110. The voltage detection module 104 is used to obtain a voltage value of the power supply path 110. The multiplication module 106 is used to generate a power value of the power supply path 110 using the current value and the voltage value. The power overload protection module 108 is used to determine whether to switch off the input 112 of the power supply path 110 according to the power value, so that the power overload protection module 108 protects a system load 114 connected to the power supply path 110. The current detection module 102, the voltage detection module 104, and the multiplication module 106 are integrated within a chip 119.

In one embodiment, the power monitoring circuit 100 further includes a temperature compensation circuit 116 integrated in the chip 119. The temperature compensation circuit 116 detects a temperature value of the power supply path 110 and sends the temperature value to the power overload protection module 108. The power overload protection module 108 uses the temperature value to determine whether to switch off the input 112 of the power supply path 110.

In another embodiment, the power monitoring circuit 100 further includes a power detection module 130. The power detection module 130 determines a power value according to a signal provided by the multiplication module 106. The power value can be provided to the power overload protection module 108 or a power unit controller 118.

In one embodiment, the power overload protection module 108 sets a safe range of the voltage value, a safe range of the current value, a safe range of the temperature value, or a safe range of the power value to determine whether to switch off the input 112 of the power supply path 110. The power overload protection module 108 therefore protects the system load 114 connected to the power supply path 110.

For example, a designer can set an upper limit and a lower limit of the power. When the power is lower than the lower limit or higher than the upper limit, the power overload protection module 108 switches off the input 112 of the power supply path 110 to protect the system load 114 connected to the power supply path 110. The designer can also set upper limits and lower limits of the voltage value, the current value, and the temperature value. When the voltage value, the current value, or the temperature value exceeds its corresponding upper or lower limit, the power overload protection module 108 switches off the input 112 of the power supply path 110. Therefore, the invention can detect power automatically and provides feedback to the power supply path 110 to protect the system load 114 connected to the power supply path 110.

In one embodiment, the power monitoring circuit 100 further includes a power unit controller 118. The power unit controller 118 generates a power status signal according to the current value, the voltage value, and the power value. The power unit controller 118 sends the power status signal to the system load 114 to provide the system load 114 with information about power quality.

For example, the system load 114 can be a laptop computer. The laptop computer receives the power status signal 120 and then can show information regarding power sufficiency or power deficiency on the screen. A user then knows the status of the power.

In one embodiment, the power unit controller 118 generates a heat control signal 122 according to the current value, the voltage value, and the power value. The power unit controller 118 sends the heat control signal 122 to the system load 114 to provide the system load 114 with power information.

In one embodiment, the current detection module 102, the voltage detection module 104, the multiplication module 106, the power detection module 130, the temperature compensation circuit 116, the power overload protection module 108, and the power unit controller 118 are all integrated within a chip 119.

The information about power includes, for example, the current value, the voltage value, or the power value. These values can be provided to the system load 114 for further action. For example, the system load 114 can determine a working frequency of a central processing unit of the system load 114 according to the heat control signal 122. When the central processing unit finds that the power is overly high, the central processing unit can lower the working frequency to reduce the heat and the power consumption.

In one embodiment, the system load 114 can also determine a rotary speed of a fan. When the system load 114 finds that the power is overly high, it can increase the rotary speed of the fan to dissipate the heat generated by the system load 114.

Taking a laptop computer as an example, the input 112 of the power supply path 110 can be connected to a battery 128 and an AC power source 126. When the laptop computer is not connected to the AC power source 126, the laptop computer uses the battery 128 as a power source. The power overload protection module 108 can determine the timing for switching off the input 112.

In one embodiment, the current detection module 102 obtains the current value of the power supply path 110 through a current sensing resister 124. The voltage detection module 104 obtains the voltage value of the power supply path 110 through the current sensing resister 124.

The invention has at least the following advantages. Each embodiment can present one or more of the advantages. With reference to FIG. 1, the power monitoring circuit can detect power and automatically feed back to an input 112 of a power supply path 110 to protect a system load 114 connected to the power supply path 110. The power monitoring circuit can generate a heat control signal 122 to the system load 114 to lower the temperature or the power. The system load 114 can determine a working frequency of a central processing unit of the system load 114 according to the heat control signal 122. The system load 114 can also determine a rotary speed of a fan to dissipate the heat generated by the system load 114 according to the heat control signal 122. The power monitoring circuit that can set safe ranges for voltage value, current value, and power value. A single chip 119 is used to detect automatically the power and feed back to the power supply path 110.

Although the present invention has been described in considerable detail with reference to certain preferred embodiments thereof, other embodiments are possible. Therefore, their spirit and scope of the appended claims should not be limited to the description of the preferred embodiments contained herein.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A power monitoring circuit having an automatic feedback function and an overload protection function, the power monitoring circuit comprising:
   a current detection module electrically connected to a power supply for obtaining a current value of the power supply;
   a voltage detection module electrically connected to the power supply for obtaining a voltage value of the power supply;
   a multiplication module electrically connected to both the current detection module and the voltage detection module for generating a power value using the current value and the voltage value;
   a temperature compensation circuit detecting a temperature value of the power supply path; and
   a power overload protection module electrically connected to the multiplication module and the temperature compensation circuit for determining whether to switch off a power supply path between the power supply and a system load according to at least one of the power value and the temperature value, so that the power overload protection module protects the system load connected to the power supply by the power supply path;
   wherein the current detection module, the voltage detection module, the multiplication module and the temperature compensation circuit are integrated within a chip.

2. The power monitoring circuit of claim 1, wherein the power overload protection module sets a safe range of the voltage value, a safe range of the current value, and a safe range of the temperature value to determine whether to switch off the power supply path, whereby the power overload protection module protects the system load connected to the power supply path.

3. The power monitoring circuit of claim 1, further comprising a power unit controller, wherein the power unit controller generates a power status signal according to the current value, the voltage value, and the power value, and the power unit controller sends the power status signal to the system load to provide the system load with power information quality.

4. The power monitoring circuit of claim 1, further comprising a power unit controller, wherein the power unit controller generates a heat control signal according to the current value, the voltage value, and the power value, and the power unit controller sends the heat control signal to the system load to provide the system load with power information.

5. The power monitoring circuit of claim 4, wherein the system load determines a working frequency of a central processing unit of the system load according to the heat control signal.

6. The power monitoring circuit of claim 4, wherein the system load determines a rotary speed of a fan according to the heat control signal.

7. The power monitoring circuit of claim 1, wherein the power supply path is connected to a battery and an AC power source.

8. The power monitoring circuit of claim 1, wherein the current detection module obtains the current value of the power supply path through a current sensing resister and the voltage detection module obtains the voltage value of the power supply path through the current sensing resister.

9. The power monitoring circuit of claim 1, wherein the system load is a laptop computer.

10. The power monitoring circuit of claim 1, wherein the power overload protection module sets a safe range of the power value to determine whether to switch off the power supply path, whereby the power detection module protects the system load connected to the power supply path.

11. A laptop computer having an automatic feedback function and an overload protection function, the laptop computer comprising:
    a system load connected to a power supply by a power supply path;
    a current detection module electrically connected to the power supply for obtaining a current value of the power supply path;
    a voltage detection module electrically connected to the power supply for obtaining a voltage value of the power supply path;
    a multiplication module electrically connected to both the current detection module and the voltage detection module for generating a power value using the current value and the voltage value;
    a temperature compensation circuit detecting a temperature value of the power supply path; and
    a power overload protection module electrically connected to the multiplication module and the temperature compensation circuit for determining whether to switch off the power supply path according to at least one of the power value and the temperature value, so that the power overload protection module protects the system load.

12. The laptop computer of claim 11, wherein the current detection module, the voltage detection module, the multiplication module and the temperature compensation circuit are integrated in a chip.

13. The laptop computer of claim 11, wherein the power overload protection module sets a safe range of the voltage value, a safe range of the current value, and a safe range of the temperature value to determine whether to switch off the power supply path, whereby the power overload protection module protects the system load connected to the power supply path.

14. The laptop computer of claim 11, further comprising a power unit controller, wherein the power unit controller generates a power status signal according to the current value, the voltage value, and the power value, and the power unit controller sends the power status signal to the system load to provide the system load with power information quality.

15. The laptop computer of claim 11, further comprising a power unit controller, wherein the power unit controller generates a heat control signal according to the current value, the voltage value, and the power value, and the power unit controller sends the heat control signal to the system load to provide the system load with power information.

16. The laptop computer of claim 15, wherein the system load determines a working frequency of a central processing unit of the system load according to the heat control signal.

17. The laptop computer of claim 15, wherein the system load determines a rotary speed of a fan.

18. The laptop computer of claim 11, wherein the power supply path is connected to a battery and an AC power source.

19. The laptop computer of claim 11, wherein the current detection module obtains the current value of the power supply path through a current sensing resister, and the voltage detection module obtains the voltage value of the power supply path through the current sensing resister.

20. The laptop computer of claim 11, wherein the power overload protection module sets a safe range of the power value to determine whether to switch off the power supply path, whereby the power detection module protects the system load connected to the power supply path.

* * * * *